United States Patent
Császár et al.

(10) Patent No.: US 9,438,472 B2
(45) Date of Patent: Sep. 6, 2016

(54) EXTENDED REMOTE LFA FAST REROUTE

(71) Applicant: Telefonaktiebolaget L M Ericsson (publ), Stockholm (SE)

(72) Inventors: András Császár, Budapest (HU); Balázs Peter Gerö, Budapest (HU); Gabor Sandor Enyedi, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 367 days.

(21) Appl. No.: 13/946,827

(22) Filed: Jul. 19, 2013

(65) Prior Publication Data
US 2015/0023156 A1   Jan. 22, 2015

(51) Int. Cl.
*H04L 12/24* (2006.01)
*H04L 12/721* (2013.01)
*H04L 12/703* (2013.01)
*H04L 12/707* (2013.01)
*H04L 12/723* (2013.01)

(52) U.S. Cl.
CPC ............ *H04L 41/0668* (2013.01); *H04L 45/12* (2013.01); *H04L 45/22* (2013.01); *H04L 45/28* (2013.01); *H04L 45/50* (2013.01)

(58) Field of Classification Search
CPC ....... H04L 45/28; H04L 45/22; H04L 45/18; H04L 41/0668; H04L 45/12
See application file for complete search history.

(56) References Cited

U.S. PATENT DOCUMENTS

| | | |
|---|---|---|
| 8,861,340 B1* | 10/2014 | Atlas ............... H04L 45/28 370/225 |
| 2013/0107698 A1 | 5/2013 | Bejerano et al. |
| 2014/0280711 A1* | 9/2014 | Asati ................ H04L 67/10 709/217 |

OTHER PUBLICATIONS

RFC 5286 (Atlas et al., Basic Specification for IP Fast Reroute: Loop-Free Alternates, Sep. 2008, all pages).*
RFC 6571 (Filsfils et al., Loop-Free Alternate (LFA) Applicability in Service Provider (SP) Networks, Jun. 2012, all pages).*
Bryant, S., et al., "Remote LFA FRR draft-ietf-rtgwg-remote-lfa-02", *Tata Communications*; May 23, 2013; 15 pages.

\* cited by examiner

*Primary Examiner* — Chirag Shah
*Assistant Examiner* — Srinivasa Reddivalam
(74) *Attorney, Agent, or Firm* — Nicholson, De Vos, Webster & Elliot, LLP

(57) ABSTRACT

A method is implemented by a network element or controller for determining a backup path for a fast reroute process to be utilized in response to a network event invalidating a primary path to a destination node. The method identifies at least one intermediate node that has a backup loop free alternative (LFA) path to a destination node in a network where no path meeting LFA conditions can be found for a point of local repair (PLR).

18 Claims, 12 Drawing Sheets

US 9,438,472 B2

EXTENDED REMOTE LFA FAST REROUTE

FIELD OF THE INVENTION

The embodiments of the invention relate to the field of network routing. Specifically, the embodiments relate to a method and system for efficiently increasing the scenarios where backup loop free alternate (LFA) paths can be found.

BACKGROUND

Internet Protocol (IP) traffic can be routed across the Internet by using discovery and routing protocols that are executed by the nodes of the Internet such that they can determine optimal and loop free routes from any data traffic source to any data traffic destination using topology information exchanged between the nodes. Each node in the network utilizes the topology ascertained through the discovery protocols to construct forwarding tables that are consistent across the network. The process of arriving at these routes and forwarding tables can be called 'convergence.' The routes and forwarding tables are recalculated when there is a change in network topology. However, re-calculating these routes and tables can take time (i.e., long convergence time) during which some traffic may be blocked or lost.

IP and Multi-Protocol Label Switching (MPLS) Fast Reroute (IPFRR) technologies address the problem with the long convergence of routing protocols by providing backup paths, which are used when network failures occur. These technologies are important due to the increased use of IP transport for real time services such as video, voice and television and the increasing number of web services which all are expected to work without disruption.

The standard approach used in existing technologies, such as open shortest path first (OSPF)/intermediate system-intermediate system (ISIS)/link discovery protocol (LDP) loop free alternative (LFA), maximally redundant trees (MRT), border gateway protocol (BGP) fast reroute (FRR), is to gather network information using a routing/signaling protocol and based on that information compute the backup paths necessary to prepare for failures of adjacent links or nodes, and then to pre-provision the forwarding plane with those back-up paths. The forwarding plane is then able to react on a failure event and switch from a primary path to a back-up path without waiting for the routing protocol to gather updated network information and converge.

SUMMARY

A method is implemented by a network element for determining a backup path for a fast reroute process to be utilized in response to a network event invalidating a primary path to a destination node. The method identifies at least one intermediate node that has a backup loop free alternative (LFA) path to a destination node in a network where no path meeting LFA conditions can be found for a point of local repair (PLR). The method can include calculating shortest paths from the PLR to each destination node in the network using a normal topology and calculating shortest paths from the PLR to each destination node in the network using a unit cost topology. A next destination node D in the network without a calculated backup path from the PLR is selected. A primary path next hop node F for the destination node D is then determined. A check is made whether an LFA path or remote LFA (RLFA) path exists from the PLR to the destination node D where the backup LFA path or RLFA path does not traverse the primary path next hop node F in the calculated shortest paths using the normal topology. A check is made whether a remote RLFA path exists from the PLR to the destination node D where the backup LFA path or RLFA path does not traverse the primary path next hop node F in the calculated shortest paths using the unit cost topology. An intermediate node on a shortest path that does not traverse the primary next hop node F and that meets LFA conditions is determined and the intermediate node on the shortest path is selected as an intermediate destination for data traffic for destination node D.

A network element is presented for determining a backup path for a fast reroute process to be utilized in response to a network event invalidating a primary path to a destination node. The method identifies at least one intermediate node that has a backup loop free alternative (LFA) path to a destination node in a network where no path meeting LFA conditions can be found for a point of local repair (PLR). The network element comprises at least one forwarding element to forward data traffic along a primary path until the network event and to forward the data traffic along the backup LFA path after the network event. The network element also includes a network processor coupled to the at least one forwarding element. The network processor is configured to execute a primary path calculation module and a backup path calculation module. The primary path calculation module is configured to calculate shortest paths from the PLR to each destination node in the network using a normal topology. The backup path calculation module is configured to calculate shortest paths from the PLR to each destination node in the network using a unit cost topology, to select a next destination node D in the network without a calculated backup path from the PLR, to determine a primary path next hop node F for the destination node D, to check whether an LFA path or remote LFA (RLFA) path exists from the PLR to the destination node D where the backup LFA path or RLFA path does not traverse the primary path next hop node F in the calculated shortest paths using the normal topology, to check whether a remote RLFA path exists from the PLR to the destination node D where the backup LFA path or RLFA path does not traverse the primary path next hop node F in the calculated shortest paths using the unit cost topology, to determine an intermediate node on a shortest path that does not traverse the primary next hop node F and that meets LFA conditions, and to select the intermediate node on the shortest path as an intermediate destination for data traffic for destination node D.

A controller is presented for a split-architecture network configured for determining a backup path for a fast reroute process to be utilized in response to a network event invalidating a primary path to a destination node. The method identifies at least one intermediate node that has a backup loop free alternative (LFA) path to a destination where no path meeting LFA conditions can be found for a point of local repair (PLR). The controller includes a flow controller to configure the PLR to forward data traffic along a primary path before the network event and along the backup LFA path after the network event. The controller also includes a processor coupled to the flow controller. The processor is configured to execute a primary path calculation module and a backup path calculation module. The primary path calculation module is configured to calculate shortest paths from the PLR to each destination node in the network using a normal topology. The backup path calculation module is configured to calculate shortest paths from the PLR to each destination node in the network using a unit cost topology, to select a next destination node D in the network without a calculated backup path from the PLR, to determine a primary path next hop node F for the destination node D, to check whether an LFA path or remote LFA (RLFA) path exists from the PLR to the destination node D where the backup LFA path or RLFA path does not traverse the primary path next hop node F in the calculated shortest paths using the normal topology, to check whether a remote RLFA path exists from the PLR to the destination node D where the backup LFA path or RLFA path does not traverse the primary path next hop node F in the calculated shortest paths using the unit cost topology, to determine an intermediate node on a shortest path that does not traverse the primary next hop node F and that meets LFA conditions, and to select the intermediate node on the shortest path as an intermediate destination for data traffic for destination node D.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
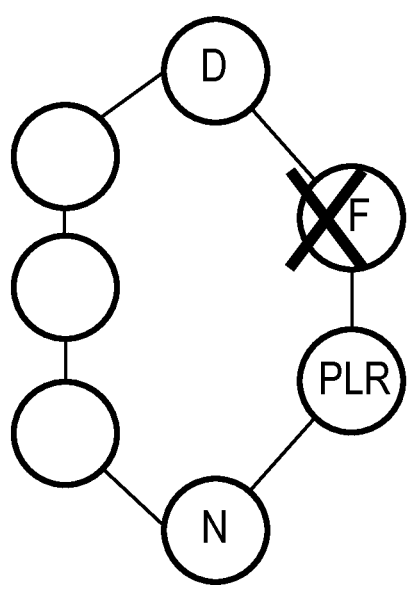
FIG. 1 is a diagram of one embodiment of network topology where standard loop free alternative (LFA) backup path calculation fails.

In the following description, numerous specific details are set forth. However, it is understood that embodiments of the invention may be practiced without these specific details. In other instances, well-known circuits, structures and techniques have not been shown in detail in order not to obscure the understanding of this description. In other instances, control structures, gate level circuits and full software instruction sequences have not been shown in detail in order not to obscure the invention. Those of ordinary skill in the art, with the included descriptions, will be able to implement appropriate functionality without undue experimentation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other, "Connected" is used to indicate the establishment of communication between two or more elements that are coupled with each other.

To facilitate understanding of the embodiments, dashed lines have been used in the figures to signify the optional nature of certain items (e.g., features not supported by a given embodiment of the invention; features supported by a given embodiment, but used in some situations and not in others).

The techniques shown in the figures can be implemented using code and data stored and executed on one or more electronic devices. An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). A 'set,' as used herein, refers to any positive whole number of items. The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is apiece of networking equipment, including hardware and software that communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

The embodiments of the invention described herein below provide a method and apparatus for use in connection with fast reroute for Internet Protocol (IP) and multi-protocol label switching (MPLS), media access control (MAC) routes or other addressing scheme used for communication in a data network. The method and apparatus support a control plane that keeps forwarding paths or next hops for both primary and back-up paths to all destination nodes. These fast rerouting technologies attempt to solve single link or node failures in IP or MPLS networks so that the fail over does not involve control plane interaction, that is, the fail over mechanism is pre-programmed. Each node is capable of detecting failures of their neighboring nodes or links with the neighboring nodes on the data plane. In the event of such a failure, referred to herein as a network event, the node switches to using the pre-programmed backup path.

Fast rerouting (FRR) technologies include the calculation of Loop Free Alternates (LFA) backup paths and remote backup LFA paths, sometimes simply referred to as LFA and remote LFA (RLFA), which are technologies used to provide Internet Protocol Fast rerouting (IPFRR) based on Interior Gateway Protocols (IGPs) such as open shortest path first (OSPF) and intermediate system-intermediate system (ISIS) protocols. An IGP running within a network element builds a database (e.g., a routing information base (RIB)), which tracks all links within the applicable network area. The process for determining backup LFA paths computes loop free alternate paths using the IGP data base. Border gateway protocol (BGP) diverse path, BGP best external, and BGP add path are BGP technologies, which gives BGP routers the capability to distribute and learn multiple alternates for a single prefix and the ability to realize IPFRR. Examples may be discussed using specific routing and FRR technologies, however, one skilled in the art would understand that the principles, steps and structures of these examples are applicable to the other technologies.

The backup LFA identification process is carried out by each node, sometimes referred to as the point of local repair (PLR) node, in that the PLR node is preparing for the failure of its neighbor nodes which may be next hop nodes for various destination nodes by assigning an alternate neighbor node as the backup next hop node for destination nodes that can be reached via the alternate neighbor node such that the path traversing the backup path traversing this alternate neighbor node toward a destination node does not loop back to the PLR or the failed neighbor node. Specific conditions or tests are utilized to ensure that non-looping paths or loop free alternative (LFA) paths are found. In one example, these conditions which can be referred to herein as LFA conditions can be defined as:

a) If $dist(N,D)<dist(N,PLR)+dist(PLR,D)$, then the PLR node has a valid loop free path via neighbor node N through which destination node D can be reached, since neighbor node N's default shortest path does not loop back to the PLR node. In this condition $dist(x,y)$ is a function that determines a distance from node x to node y.

b) If, in addition, $dist(N,D)<dist(N,F)+dist(F,D)$, then the default shortest path from the alternate next hop neighbor node N does not go through failed node F, i.e., alternate neighbor node N is a next hop node of backup LFA path protecting node F.

FIG. 1 is a diagram of one embodiment of network topology where standard loop free alternative (LFA) backup path calculation fails. In the example, the neighbor node fails the first test as it is further from the destination node than the sum of the distance of neighbor to the PLR and the PLR to the destination node. However, a valid backup path does exist but cannot be identified by the standard LFA process.

To boost failure coverage, a remote LFA process can be utilized. With the remote LFA process, a PLR node, when detecting a local failure towards one of its next-hops, can use remote neighbors as alternates, such as a node R several hops away via a tunnel, in addition to the immediate neighbors available with standard LFA process. Traffic to this alternate node R can be sent via a tunnel (on the default shortest path) that does not go through the failure node.

In addition, to maximize failure coverage, the PLR node can select any custom neighbor node other than the failed node as the first hop for the tunnel towards remote node R, i.e., the regular shortest path tunnel from the PLR node towards remote node R may go through the failure, but if the PLR node can use a different first hop node where the shortest path does not go through the failed nod, then remote node R will be a valid remote LFA tunnel endpoint. Thus, remote node R is a valid RLFA endpoint if both of the following conditions hold, where the selected node N is a neighbor of the PLR node, that is not the failed node, (N≠F):

c) $dist(R,D)<dist(R,PLR)+dist(PLR,D)$, then remote node R's shortest path to the destination node D does not loop back to the PLR node; and d) $dist(N,R)<dist(N,PLR)+dist(PLR,R)$, then there is a neighbor from where the shortest path towards remote node R does not loop back to the PLR node.

In addition, remote node R is a node-protecting RLFA if:

e) $dist(R,D)<dist(R,F)+dist(F,D)$, then the remote node R's shortest path to the destination node D does not go through the potentially failed node F; and f) $dist(N,R)<dist(N,F)+dist(F,R)$, then there is a neighbor node N, from where the shortest path towards the remote node R does not go through the potentially failed node F.

If a valid RLFA is found, the PLR node can tunnel the relevant traffic to the remote node R using neighbor node N as its first hop. In some embodiments, tunneling means IP encapsulation in IP, or pushing a label to the label stack in the case of MPLS.

Figure 2:
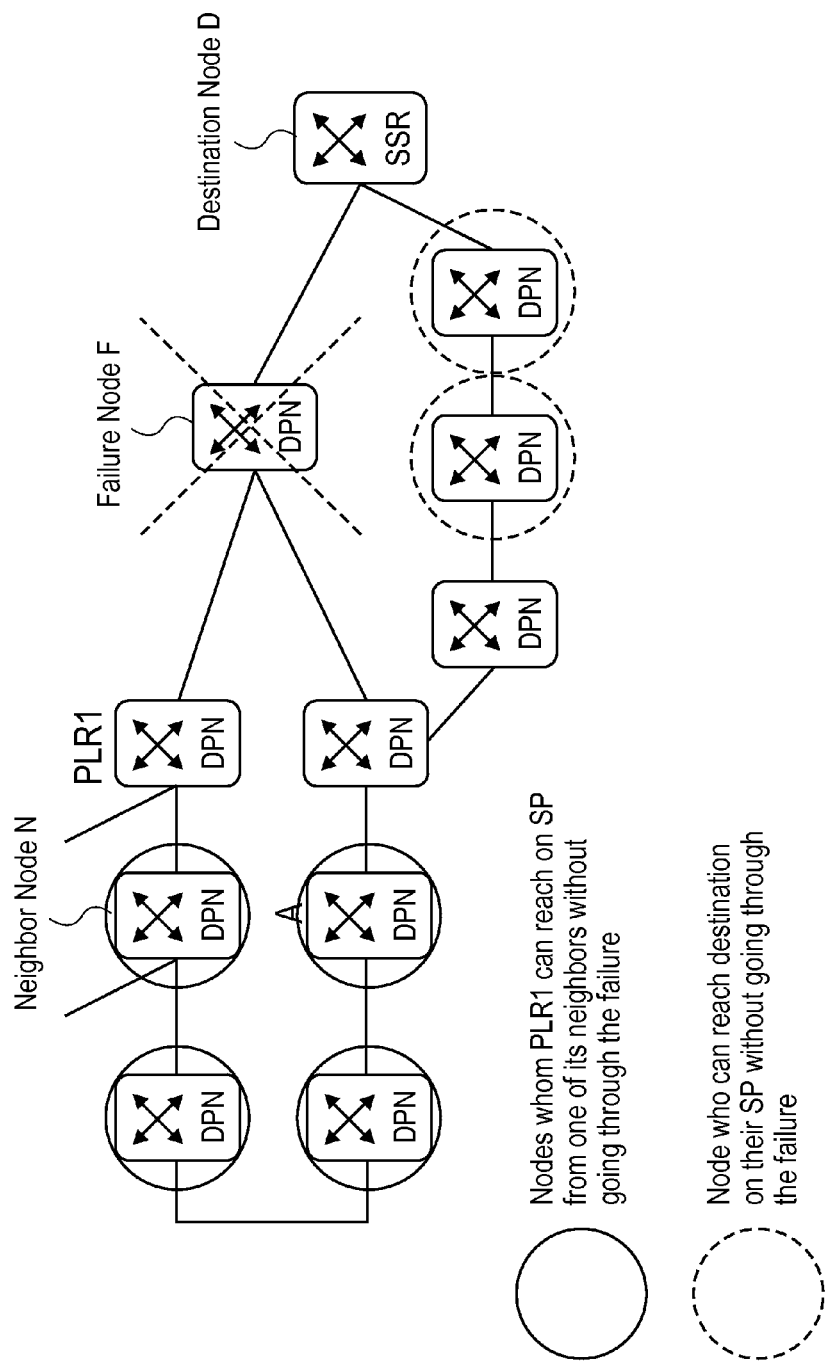
FIG. 2 is a diagram of one embodiment of network topology where standard LFA backup path and remote LFA (RLFA) calculation fails.

In networks where all link-costs are equal (referred to as "unit-cost networks"), RLFA provides 100% failure coverage for link failures. Unfortunately, it does not guarantee the same for node failures. FIG. 2 is a diagram of one embodiment of network topology where standard LFA backup path and RLFA calculation fails.

In the example network topology of FIG. 1, the failure of node F leaves the PLR1 node with only a single functioning adjacent node, neighbor node N. Using the standard LFA process only the nodes with the solid circles around them can be reached as destinations on a shortest path through its neighbor node N. All the other nodes in the network fail to meet the LFA conditions. No backup LFA to the desired destination node D meets the LFA conditions as the distance of the route from the neighbor node N exceeds the sum of the distance of the PLR to the failed node and the failed node to the destination node.

The nodes with dotted circles could reach the destination node via LFA paths and there is a possible path to the destination node D from the PLR1, but the standard LFA process cannot produce it. Further, the RLFA process cannot produce a path either. None of the nodes in the illustrated network meet all of the RLFA conditions, again despite the possible path from the PLR1 to the destination node D.

Other IPFRR proposals to provide unconditional 100% failure coverage for any single failure have been proposed. One such solution is "Not-Via" which allocates extra addresses/labels to each node, as many neighbors it has, and uses these address/labels for the detour tunnels. These labels/addresses are specially routed to avoid the failures. To simplify this "Not-Via" process, MRT (Maximally Redundant Trees) can be utilized which need two extra addresses/label independent for however many neighbors the node has. These extra addresses/labels are identifying routing in different topologies and are redundant to each other.

However, the disadvantages of the prior art include that RLFA does not provide 100% failure coverage in arbitrary networks (in particular in case of node failures or in non-unit-cost (i.e., most) networks). Not-Via has a high level of complexity and requires many addresses/labels and routing states it requires. MRT, reduces address/label/routing state complexity compared to Not-Via. But, involves a hard-to-understand algorithm, making it more difficult for operators and programmers to utilize. Also, MRT has to be supported by all nodes in and IGP area.) Shared risk link groups (SRLGs) are not supported by existing methods.

In contrast, the present invention provides 100% failure coverage for single link and node failures with only one extra address or label per node (i.e., less state than Not-Via or MRT). In addition the process is easier to grasp, i.e., software development is easier than with MRT With this process it is possible to provide 100% failure coverage with one extra address or node which has an address that is specially routed. The main idea stems from the fact the RLFA provides 100% link failure coverage in unit cost networks, so if one extra address per node is allocated and after a failure packets are switched to a topology where paths are calculated as if the topology was unit-cost, then 100% link-failure coverage can be achieved in arbitrary networks (i.e., non unit cost networks). The term "unit cost networks" refers to network topologies where each link in the network is assumed to have a same unit of measure or cost. This can also be referred to as a form of uniform cost topology, where each link is assumed to have a uniform cost or distance. For sake of clarity, the examples are described as unit cost topologies, however, one skilled in the art would understand that the principles and structures apply to uniform cost topologies.

For node and SRLG failures, a series of carefully selected RLFA end-points can solve all node failure cases. This process is referred to herein as an extended RLFA, the extensions being:

1) putting data packets on a unit-cost topology at the PLR (and using RLFA on this unit cost topology); and 2) defining rules for a PLR to use a tunnel end-point which would otherwise not meet the normal RLFA rules, not even on the unit-cost topology.

These additional rules enable the identification of an intermediate node or set of intermediate nodes along a backup path to a destination node that does not traverse the failed node, such that these intermediate nodes can define a set of intermediate LFA path destinations through which the final destination node can be reached.

Overview

Figure 3A:
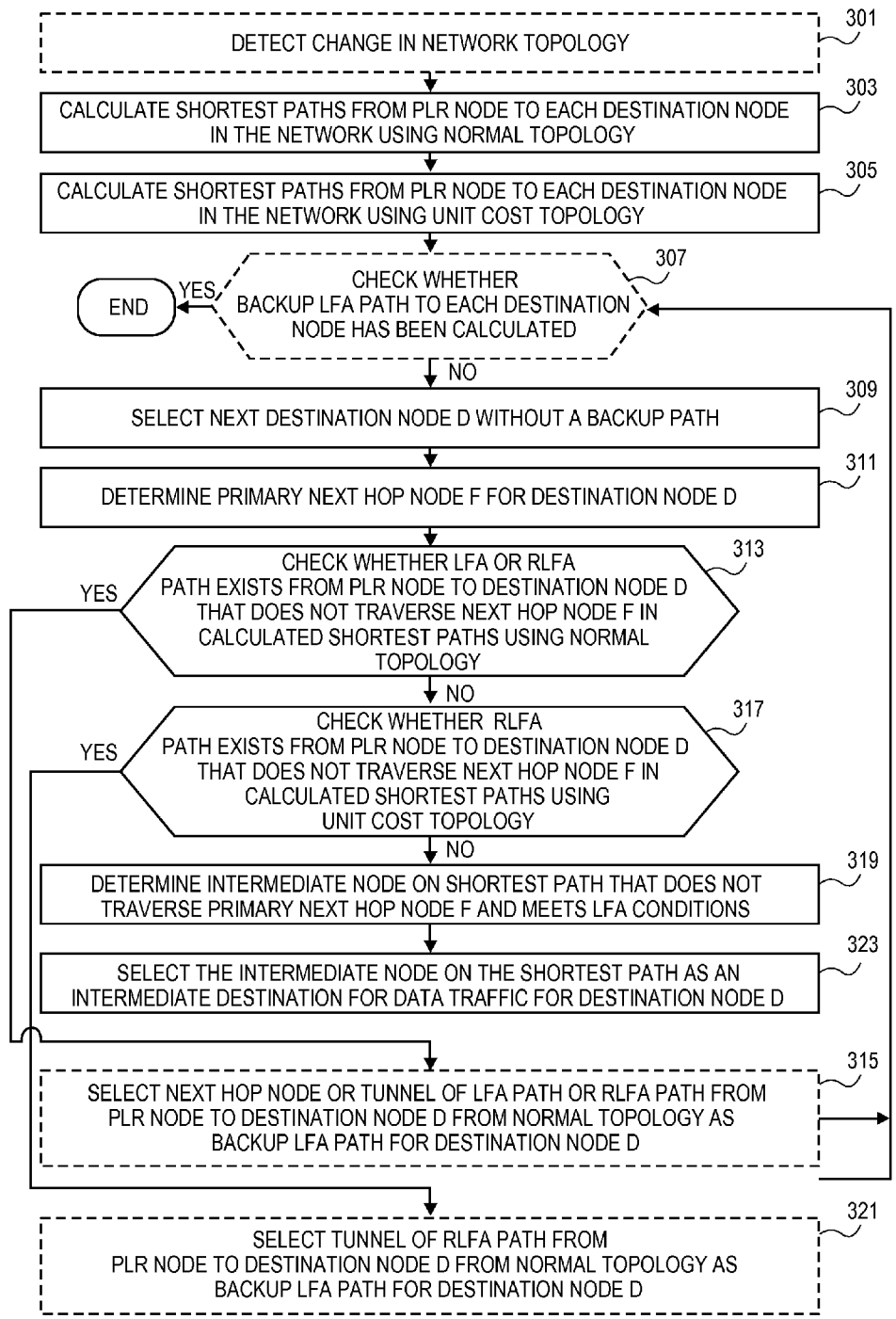
FIG. 3A is a flowchart of one embodiment of a process of identifying an intermediate node that can reach a destination node with a backup LFA path.

FIG. 3A is a flowchart of one embodiment of process of identifying an intermediate node that can reach a destination node with a backup LFA path. This embodiment is a general overview of the extended remote LFA process. Embodiments where link protection and node protection are implemented for the extended remote LFA process are described herein below with relation to FIGS. 3B and 3C. Specific example applications for IP and MPLS are discussed further herein below. This process can be applied to any network type or topology where LFA and/or RLFA are applicable.

In one embodiment, the extended remote LFA process is triggered in response to detecting a change in the network topology (Block 301). The change in the network topology or similar network event triggers each network element in the network to recalculate its primary path to each possible destination node in the network as well as the backup LFA paths to each of these destination nodes. This extended remote LFA process can be executed after each of the primary paths is calculated such that the primary path next hop for each destination node is known and is assumed to be the failed node such that a backup LFA path through an alternate neighbor node must be calculated in support of a FRR technology. The extended remote LFA process is independent of the FRR in the sense that the FRR will switch to the use of the previously calculated backup LFA path upon failure of an adjacent link or node without waiting for the recalculation of routes in light of the changed topology of the network. The extended remote LFA process updates the backup LFA paths separately from the FRR switch whenever a change in network topology occurs.

The extended remote LFA process can begin by calculating the shortest path from the PLR node implementing the process to each possible destination node D in the network (Block 303). These calculations use the standard or normal topology of the network. These shortest paths serve as the primary or default paths from the PLR node to the destination nodes. The shortest paths from the PLR node to each destination node are also calculated using the unit cost topology or similar uniform cost topology (Block 305).

A check is then made whether any backup LFA paths remain to be calculated, where one backup LFA is expected to be calculated for each destination node in the network (Block 307). If all of the backup LFA paths have been calculated then the process can exit. If however, some destination nodes do not have backup LFA paths calculated, then the process continues by selecting a next destination node D in the network topology to calculate a backup LFA path to the destination node D from the PLR node (Block 309). In this example, the extended remote LFA process iterates through all of the possible destination nodes D. The destination nodes can be selected in any order or with any technique. For example, the next closest or furthest destination node can be selected for which a backup path has not been selected. The primary next hop node F for the selected destination node D is determined by examining the primary path information that has already been calculated (Block 311). This next hop node F is assumed to have failed and the extended remote LFA process will find an alternated next hop and path to the destination node D.

Where a backup LFA path is needed, the process then checks whether a backup LFA path or remote LFA path to the destination node D exists where the backup LFA path or remote LFA path does not traverse the failed node F using the calculated shortest paths based on the normal topology of the network (Block 313). In other words, the standard LFA process is applied to find a backup LFA path. This process may not succeed in finding such a backup LFA path dependent on the network topology, regardless of whether a possible backup path exists as discussed above. The LFA process can also utilize the RLFA process to locate a backup LFA path. Thus, this step encompasses both options and processes. If a backup LFA path or remote LFA path is found, then the process stores that path or the next hop of the path as the backup LFA path for the destination node D (Block 315). The extended remote LFA process would then continue to check whether additional destination nodes remain in need of backup path calculation (Block 307).

If a backup LFA path (including either a standard LFA or an RLFA path) is not found using the LFA or RLFA processes over the normal topology, then the extended remote LFA process attempts to find a backup LFA path, or more precisely a remote LFA path, to the destination node D where the backup LFA path does not traverse the primary path next hop node F using the shortest paths that were calculated using the unit cost topology (or similar uniform cost topology) (Block 317). It should be noted that the unit cost LFA paths can be utilized when unit cost network data packets are received, i.e., data packets using the special addresses of the unit cost topology, such as in situations where the current PLR node is an intermediate destination for another PLR. In cases where the backup LFA was not found using the standard topology, but a remote node R is found using the unit cost topology that provides a remote LFA path to the destination node D (Block 321), a tunnel can be selected to the remote node R as the next hop to be utilized for the destination node D (Block 323).

Where a backup LFA path was found using the unit cost topology, it can be stored (in the routing information base or similar data structure) and the process can continue to check if there is another destination node in need a backup path (Block 307). However, where a backup LFA path was not found using either topology, then the process continues by determining a shortest path from the PLR node to the destination node D where the backup LFA path does not traverse the primary path next hope node F (Block 319). This calculation can remove the next hop node F from the unit cost topology to find a set of shortest paths to the destination node D. Any algorithm can be utilized to determine the shortest path such as Dijkstra's algorithm using the alternative neighboring nodes as the starting point or identifying the failed node that cannot be traversed dependent on the shortest path algorithm.

A check can then be made whether this shortest path includes any nodes that meet the LFA conditions. In cases where a shortest path is not found, then there is no possible backup LFA path and the process continues to the next destination node (Block 307). Where a shortest path has been found, then the extended remote LFA process identifies an intermediate node along the shortest path that is closest to the destination node D, but meets the LFA conditions (i.e., either the LFA or RLFA conditions discussed above) (Block 319). This intermediate node is then selected as the intermediate destination for data traffic associated with the destination node D. In other words, the backup path and the next hop for the destination node D is selected as backup path and the next hop for the intermediate destination node. Data traffic forwarded toward the intermediate destination node will be able to reach the destination node D, because the intermediate destination node will either be configured according to the extended remote LFA process with another intermediate destination node or will be able to reach the destination node via a backup LFA path.

This process continues until all of the destination nodes have had a backup LFA path calculated such that the backup LFA path and next hop are stored in a routing information base (RIB), forwarding information base (FIB) or similar data structure to be utilized by FRR technologies such as IPFRR. Specific example implementation and application are discussed further herein below.

Figure 3B:
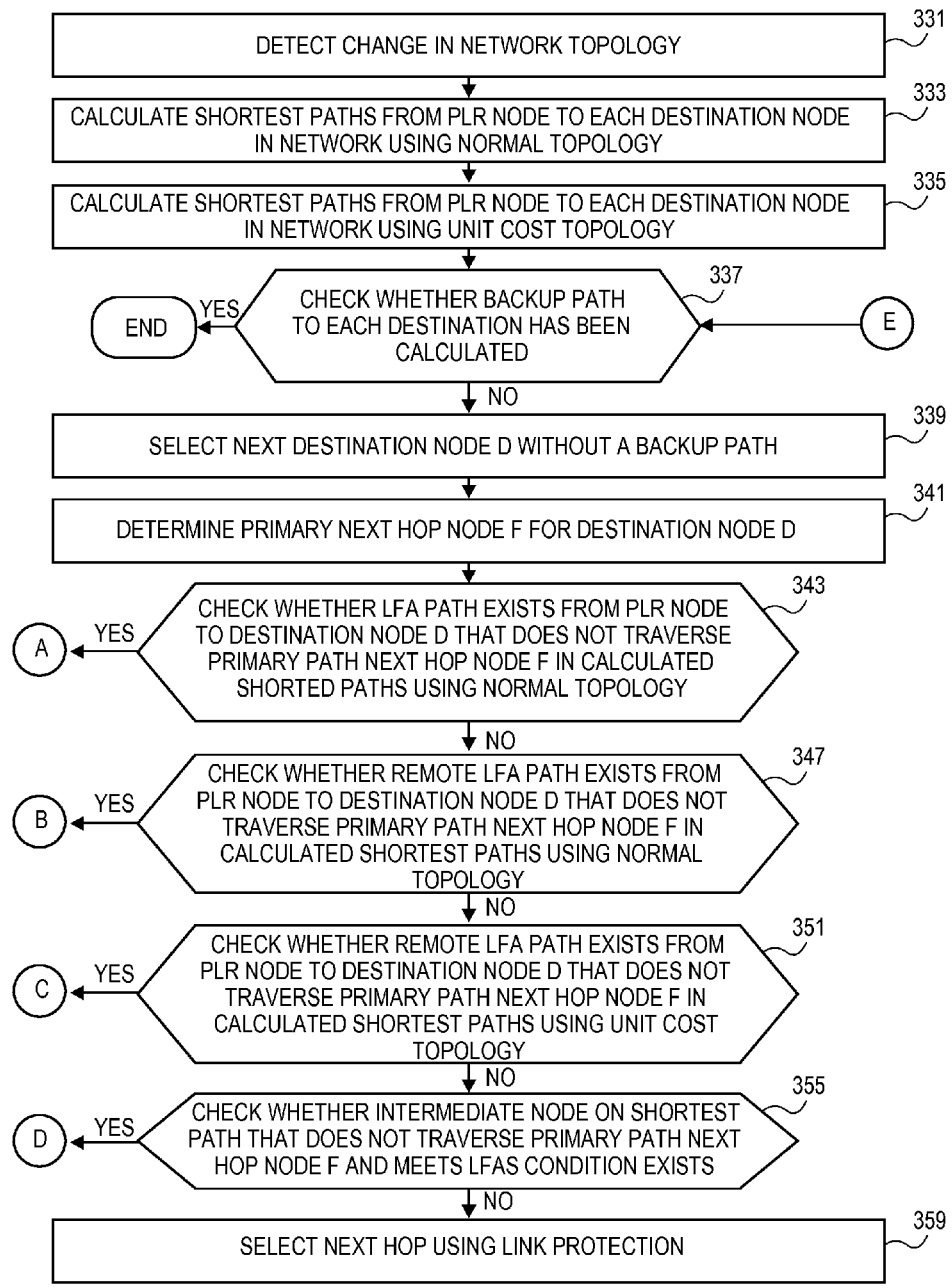
FIG. 3B is a flowchart of one embodiment of a process of identifying a backup LFA path for node protection.
Figure 3B:
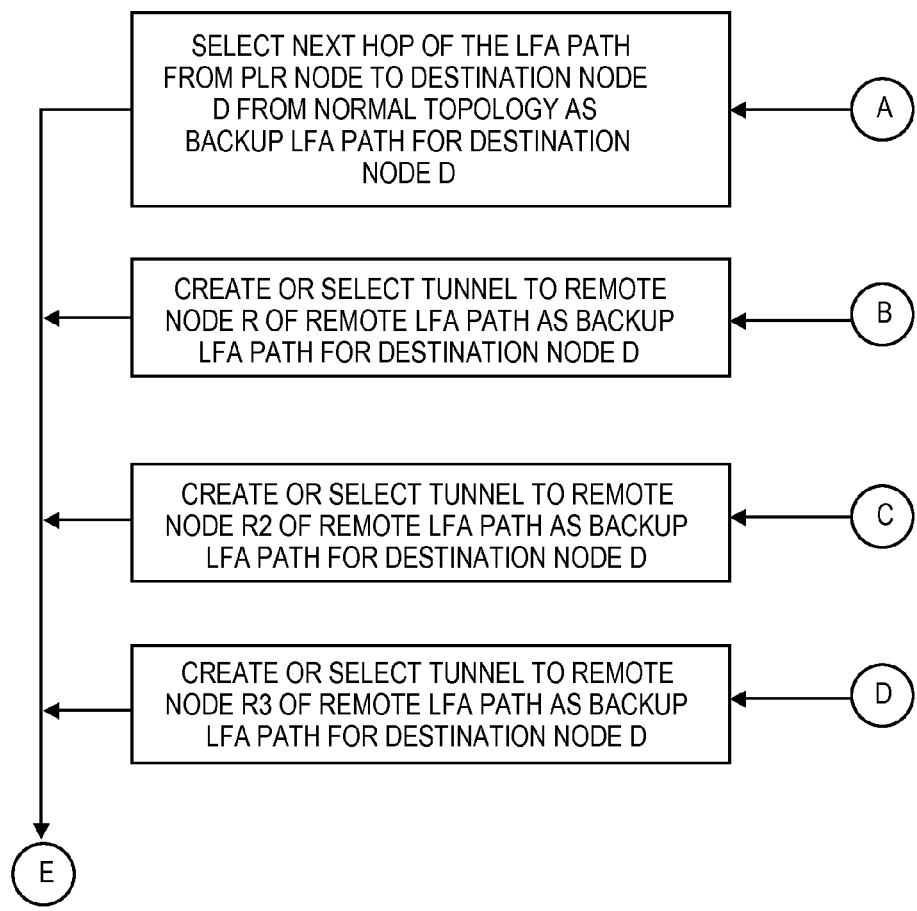

FIG. 3B is a flowchart of one embodiment of a process of identifying a backup LFA path for node protection. In one embodiment, the extended remote LFA process is triggered in response to detecting a change in the network topology (Block 331). The change in the network topology or similar network event triggers each network element in the network to recalculate its primary path to each possible destination node in the network as well as the backup LFA paths to each of these destination nodes. This extended remote LFA process can be executed after each of the primary paths is calculated such that the primary path next hop for each destination node is known and is assumed to be the failed node such that a backup LFA path through an alternate neighbor node must be calculated in support of a FRR technology. The extended remote LFA process is independent of the FRR in the sense that the FRR will switch to the use of the previously calculated backup LFA path upon failure of an adjacent link or node with waiting for the recalculation of routes in light of the changed topology of the network. The extended remote LFA process updates the backup LFA paths separately from the FRR switch whenever a change in network topology occurs.

The extended remote LFA process can begin by calculating the shortest path from the PLR node implementing the process to each possible destination node D in the network (Block 333). These calculations use the standard or normal topology of the network. These shortest paths serve as the primary or default paths from the PLR node to the destination nodes. The shortest paths from the PLR node to each destination node are also calculated using the unit cost topology or similar uniform cost topology (Block 335).

A check is then made whether any backup LFA paths remain to be calculated, where one backup LFA is expected to be calculated for each destination node in the network (Block 337). If all of the backup LFA paths have been calculated then the process can exit. If, however, some destination nodes do not have backup LFA paths calculated, then the process continues by selecting a next destination node D in the network topology to calculate a backup LFA path to the destination node D from the PLR node (Block 339). In this example, the extended remote LFA process iterates through all of the possible destination nodes D. The destination nodes can be selected in any order or with any technique. For example, the next closest or furthest destination node can be selected for which a backup path has not been selected. The primary next hop node F for the selected destination node D is determined by examining the primary path information that has already been calculated (Block 341). This next hop node F is assumed to have failed and the extended remote LFA process will find an alternated next hop and path to the destination node D.

Where a backup LFA path is needed, the process then checks whether a backup LFA path to the destination node D exists where the backup LFA path does not traverse the failed node F using the calculated shortest paths based on the normal topology of the network (Block 343). In other words, the standard LFA process is applied to find a backup LFA path. This process may not succeed in finding such a backup LFA path dependent on the network topology, regardless of whether a possible backup path exists as discussed above.

If this check fails, then the extended remote LFA process can then utilize the RLFA process to locate a backup LFA path. The process can check whether a backup remote LFA path to the destination node D exists where the backup remote LFA path does not traverse the failed node F using the calculated shortest paths based on the normal topology of the network (Block 347). If a backup LFA path or remote LFA path is found, then the process stores that path or the next hop of the path as the backup LFA path for the destination node D or a tunnel to a remote node R (Blocks 345 or 349). In cases where the standard backup LFA was not found using the standard topology, but a remote node R is found using the standard topology that provides a remote LFA path to the destination node D, a tunnel can be selected to the remote node R as the next hop to be utilized for the destination node D (Block 349). The extended remote LFA process would then continue to check whether additional destination nodes remain in need of backup path calculation (Block 337).

If a backup LFA path (including either a standard LFA or an RLFA path) is not found using the LFA or RLFA processes over the normal topology, then the extended remote LFA process attempts to find a backup LFA path, or more precisely a remote LFA path, to the destination node D where the backup LFA path does not traverse the primary path next hop node F using the shortest paths that were calculated using the unit cost topology (or similar uniform cost topology) (Block 351).

In cases where the backup LFA was not found using the standard topology, but a remote node R2 is found using the unit cost topology that provides a remote LFA path to the destination node D, a tunnel can be selected to the remote node R2 as the next hop to be utilized for the destination node D (Block 353).

Where a backup LFA path was found using the unit cost topology, it can be stored (in the routing information base or similar data structure) and the process can continue to check if there is another destination node in need a backup path (Block 337). However, where a backup LFA path was not found using either topology, then the process continues by determining a shortest path from the PLR node to the destination node D where the backup LFA path does not traverse the primary path next hope node F (Block 355). This calculation can remove the next hop node F from the unit cost topology to find a set of shortest paths to the destination node D. Any algorithm can be utilized to determine the shortest path such as Dijkstra's algorithm using the alternative neighboring nodes as the starting point or identifying the failed node that cannot be traversed dependent on the shortest path algorithm.

A check can then be made whether this shortest path includes any nodes that meet the LFA conditions. In cases where a shortest path is not found, then the link protection process (described herein below) can be utilized to select a next destination node (Block 359), the link process can be shortened to remove those redundant steps already performed herein above in this node protection process. Where a shortest path has been found, then the extended remote LFA process identifies an intermediate node along the shortest path that is closest to the destination node D, but meets the LFA conditions (i.e., either the LFA or RLFA conditions discussed above) (Block 355). This intermediate node is then selected as the intermediate destination for data traffic associated with the destination node D (Block 357). In other words, the backup path and the next hop for the destination node D is selected as backup path and the next hop for the intermediate destination node. Data traffic forwarded toward the intermediate destination node will be able to reach the destination node D, because the intermediate destination node will either be configured according to the extended remote LFA process with another intermediate destination node or will be able to reach the destination node via a backup LFA path.

This process continues until all of the destination nodes have had a backup LFA path calculated such that the backup LFA path and next hop are stored in a routing information base (RIB), forwarding information base (FIB) or similar data structure to be utilized by FRR technologies such as IPFRR. Specific example implementation and application are discussed further herein below.

Figure 3C:
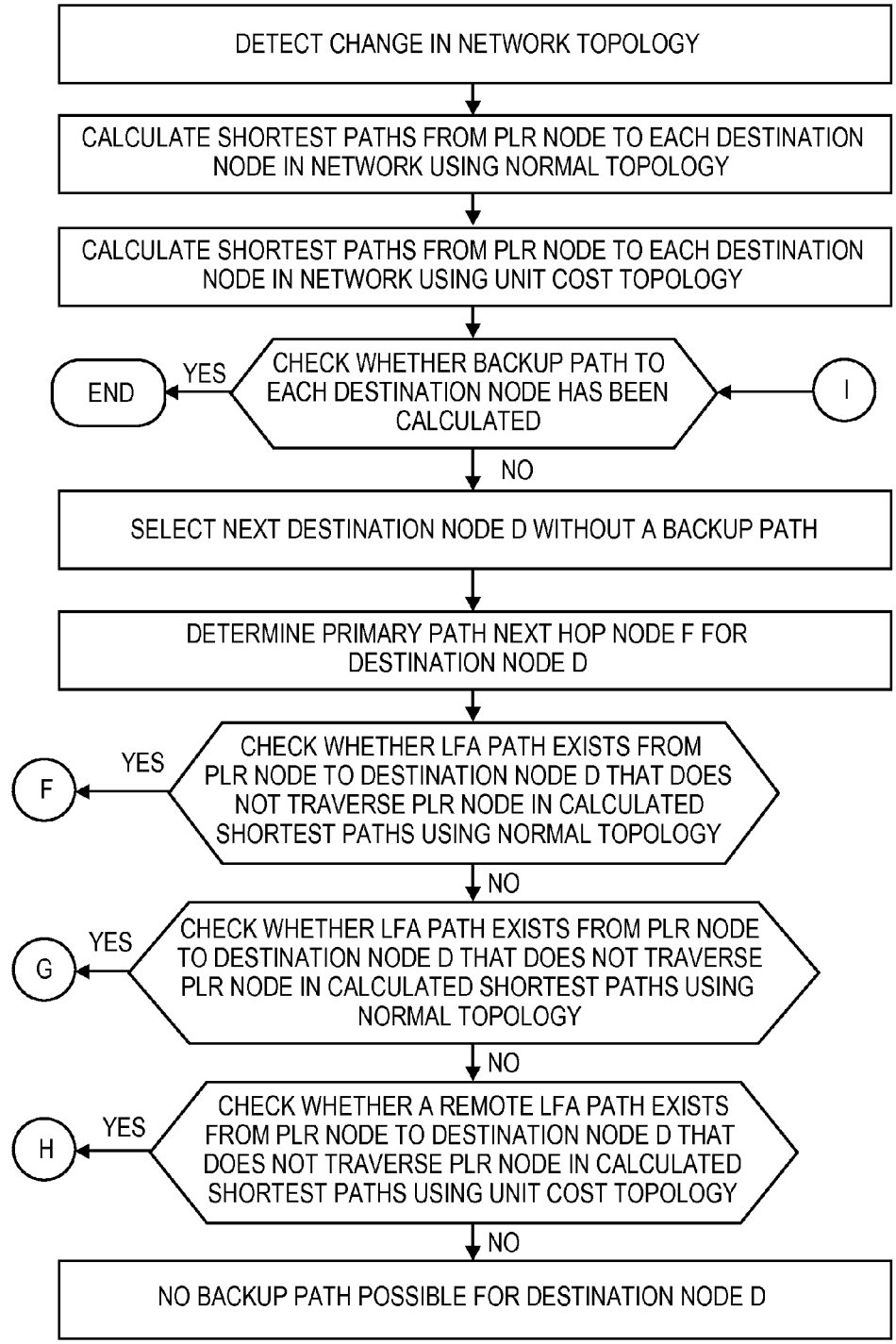
FIG. 3C is a flowchart of one embodiment of a process of identifying a backup LFA path for link protection.
Figure 3C:
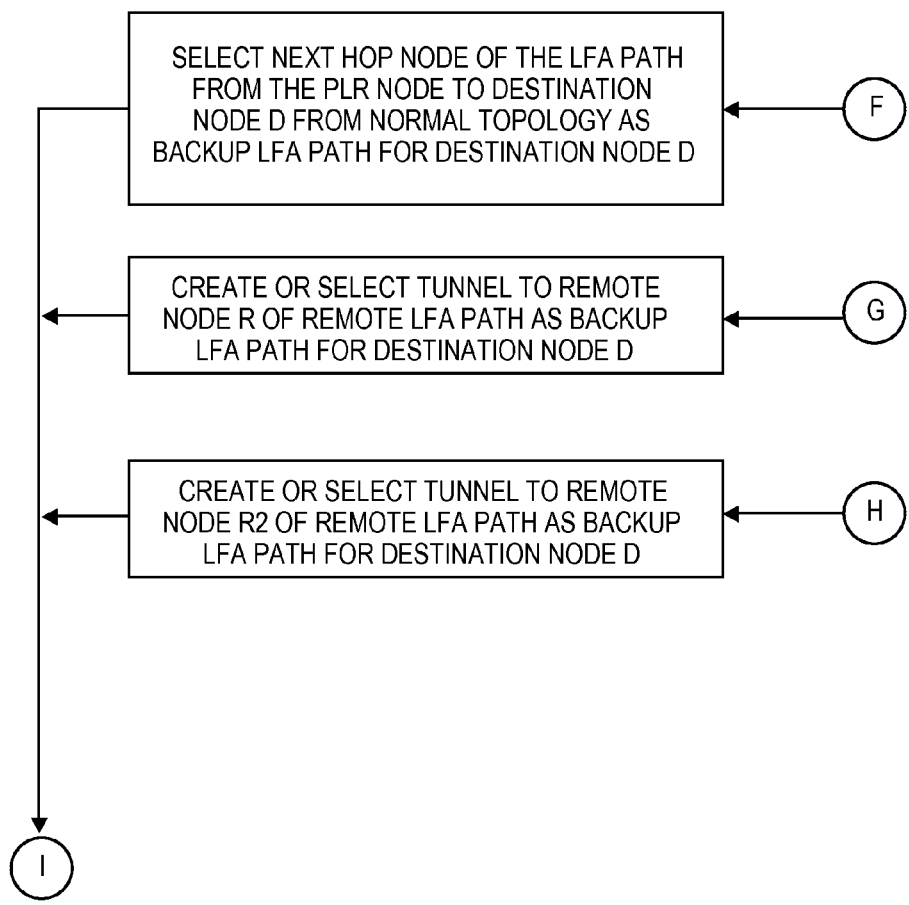

FIG. 3C is a flowchart of one embodiment of a process of identifying a backup LFA path for link protection. In one embodiment, the extended remote LFA process is triggered in response to detecting a change in the network topology (Block 371). The change in the network topology or similar network event triggers each network element in the network to recalculate its primary path to each possible destination node in the network as well as the backup LFA paths to each of these destination nodes. This extended remote LFA process can be executed after each of the primary paths is calculated such that the primary path next hop for each destination node is known and is assumed to be the node with a failed link such that a backup LFA path through an alternate neighbor node or link must be calculated in support of a FRR technology. The extended remote LFA process is independent of the FRR in the sense that the FRR will switch to the use of the previously calculated backup LFA path upon failure of an adjacent link or node with waiting for the recalculation of routes in light of the changed topology of the network. The extended remote LFA process updates the backup LFA paths separately from the FRR switch whenever a change in network topology occurs.

The extended remote LFA process can begin by calculating the shortest path from the PLR node implementing the process to each possible destination node D in the network (Block 373). These calculations use the standard or normal topology of the network. These shortest paths serve as the primary or default paths from the PLR node to the destination nodes. The shortest paths from the PLR node to each destination node are also calculated using the unit cost topology or similar uniform cost topology (Block 375).

A check is then made whether any backup LFA paths remain to be calculated, where one backup LFA is expected to be calculated for each destination node in the network (Block 377). If all of the backup LFA paths have been calculated then the process can exit. If, however, some destination nodes do not have backup LFA paths calculated, then the process continues by selecting a next destination node D in the network topology to calculate a backup LFA path to the destination node D from the PLR node (Block 379). In this example, the extended remote LFA process iterates through all of the possible destination nodes D. The destination nodes can be selected in any order or with any technique. For example, the next closest or furthest destination node can be selected for which a backup path has not been selected. The primary next hop node F for the selected destination node D is determined by examining the primary path information that has already been calculated (Block 381). This next hop node F is assumed to have a failed link and the extended remote LFA process will find an alternated next hop or path to the destination node D. The backup path will meet the LFA condition a) defined above, which requires that a path not loop back through the PLR. This allows for paths through the primary next hop node F, which is different than the above node protection process, here there is only link protection.

Where a backup LFA path is needed, the process then checks whether a backup LFA path to the destination node D exists where the backup LFA path does not traverse the failed link to node F and does not loop back to the PLR using the calculated shortest paths based on the normal topology of the network (Block 383). In other words, the standard LFA process is applied to find a backup LFA path. This process may not succeed in finding such a backup LFA path dependent on the network topology, regardless of whether a possible backup path exists as discussed above.

If this check fails, then the extended remote LFA process can then utilize the RLFA process to locate a backup LFA path. The process can check whether a backup remote LFA path to the destination node D exists where the backup remote LFA path does not traverse the failed link to node F and does not loop back through the PLR using the calculated shortest paths based on the normal topology of the network (Block 387). If a backup LFA path or remote LFA path is found, then the process stores that path or the next hop of the path as the backup LFA path for the destination node D or a tunnel to a remote node R (Blocks 385 or 389). In cases where the standard backup LFA was not found using the standard topology, but a remote node R is found using the standard topology that provides a remote LFA path to the destination node D, a tunnel can be selected to the remote node R as the next hop to be utilized for the destination node D (Block 349). The extended remote LFA process would then continue to check whether additional destination nodes remain in need of backup path calculation (Block 377).

If a backup LFA path (including either a standard LFA or an RLFA path) is not found using the LFA or RLFA processes over the normal topology, then the extended remote LFA process attempts to find a backup LFA path, or more precisely a remote LFA path, to the destination node D where the backup LFA path does not traverse the primary path next hop link to node F and does not loop back to the PLR using the shortest paths that were calculated using the unit cost topology (or similar uniform cost topology) (Block 391).

In cases where the backup LFA was not found using the standard topology, but a remote node R2 is found using the unit cost topology that provides a remote LFA path to the destination node D, a tunnel can be selected to the remote node R2 as the next hop to be utilized for the destination node D (Block 393).

Where a backup LFA path was found using the unit cost topology, it can be stored (in the routing information base or similar data structure) and the process can continue to check if there is another destination node in need a backup path (Block 377). However, where a backup LFA path was not found using either topology, then the process records that there is no viable backup LFA path between the PLR node and the destination node D where the backup LFA path does not traverse the primary path next hop link to node F and does not loop back to the PLR (Block 395).

This process continues until all of the destination nodes have had a backup LFA path calculated such that the backup LFA path and next hop are stored in a routing information base (RIB), forwarding information base (FIB) or similar data structure to be utilized by FRR technologies such as IPFRR. Specific example implementation and application are discussed further herein below.

Preparing for Link Failures

IP Networks

The routing engine of each node calculates the routes and distances on a standard topology transformed by changing all link costs to a common value (e.g., 1). This topology is referred to herein as the "unit cost topology." The controller on each node locally (e.g. implementing open shortest path first (OSPF) or intermediate system to intermediate system (ISIS)) or a network-wide central controller (such as a central software defined network (SDN) controller) advertises a new IP address for each node for which the routes (i.e. next-hops) are to be assigned in each node using the unit cost topology.

Normally, packets are routed/forwarded using the normal addresses and routes of the standard topology. However, when preparing for the failure of a PLR node losing connectivity to a failed node F on the standard topology, then for each destination node D, the controller on PLR node or a network-wide central controller will find a valid RLFA endpoint node R through one of its neighbors N using rules c) and d) (above) but on the unit cost topology (i.e., rules g) and h) (below)). The distance function dist' indicates the distance on the unit cost topology.

g) dist'(R,D)<dist'(R,PLR)+dist'(PLR,D), then remote node R's shortest path to destination node D does not loop back to PLR node on the unit cost topology; and h) dist'(N,R)<dist'(N,PLR)+dist'(PLR,R), then there is a neighbour from where the shortest path towards remote node R does not loop back to the PLR node on the unit cost topology.

In case of link failures, a remote node R can always be found on the unit cost topology. The tunnel endpoint will be remote node R's secondary address (i.e., R') to indicate routing on the unit cost topology. (The node ID with an apostrophe as used herein refers to a secondary address of the node.)

The control plane of the PLR node or the central controller configures the data plane of the PLR node so that in case of the PLR node losing connectivity to node F, then the PLR node will encapsulate packets and change the destination addresses as follows:

For destination prefixes representing the default addresses of operator's own nodes, the PLR node will change the original destination address to the secondary address of the destination node D, then encapsulate the packets to remote node R' (secondary address of RLFA endpoint) and then send the data packets on the outgoing interface to node N.

TABLE I

| Originally: | IP dest = D | Payload | |
|---|---|---|---|
| | | → to be sent through neighbor A | |
| After losing connectivity to A: | IP dest = R' | IP dest = D' | Payload |
| | | → to be sent though neighbor N | |

In the case when the destination address belongs to one of the operator's own nodes on the unit cost topology, there are two options.

1. Packets with the destination can be dropped, which protects against looping when there are multiple failures. The drawback of this solution is that node or SRLG failures are not always protected.

2. Either the node or SRLG failures can be protected (see further details later) for the price of the possibility of looping in multiple failures case. For this, packets are rerouted as previously set forth, except that the inner header's destination address does not need to be changed.

TABLE II

| | | |
|---|---|---|
| Originally: | IP dest = D' | Payload |
| | | → to be sent through neighbor A |
| After losing connectivity to A: | IP dest = R' \| IP dest = D' | Payload |
| | | → to be sent though neighbor N |

For all other destination addresses there are two possibilities again. In the simpler case the PLR node double encapsulates the packet so that the packet gets to the remote node R' on the unit cost topology from where it gets to the egress border router (node E'), which is also on the unit cost topology.

TABLE III

| | | |
|---|---|---|
| Originally: | IP dest = D | Payload |
| | | → to be sent through neighbor A |
| After losing connectivity to A: | IP dest = R' \| IP dest = E' \| IP dest = D | Payload |
| | | → to be sent though neighbor N |

However, for some routers it may be problematic to put two IP headers on a packet. In that case the remote node R may help. The original packet handled as previously set forth, but the PLR node puts only a single header on the data packet:

TABLE IV

| | | |
|---|---|---|
| After losing connectivity to A: | IP dest = R' \| IP dest = D | Payload |
| | | → to be sent though neighbor N |

Now, when remote node R receives the data packet, it recognizes that its address associated with the unit cost topology was used, which means that there was a failure in the network. Since the data packet contains another label, remote node R does an IP lookup anyway, and will find that the next header is using a normal address (for destination node D). The normal address must not be used after using the tunnel on unit cost topology since that can cause loops. Thus the remote node R will not simply forward the packet, but it uses the result of the lookup to find an egress router E. Then remote node R puts a header on the top of the packet, and sends that on the unit cost topology to E'.

TABLE V

| | | | |
|---|---|---|---|
| After reaching R: | IP dest = E' | IP dest = D | Payload |
| | | → to be sent through neighbor N | |

The second solution can be further optimized: if the last node X before the remote node R can recognize that the packet is on the backup path and heading to remote node R (i.e., the destination is remote node R'), and it contains another IP packet (IPv4 "protocol" or IPv6 "next header" field), then the node X can already create the new data packet with destination E' and send that new data packet to remote node R. This is a better solution since both node X and remote node R need to do only a single IP lookup, while without the help of node X, remote node R needs to do the first lookup with node D to find node E, and another lookup with node E' to find the shortest path towards E in the unit cost topology.

MPLS

In the case where a network utilizes MPLS, a separate MPLS label is distributed to nodes using the unit cost topology. Also, in the case where MPLS tunneling/encapsulation is implemented, this may include the use of a label push operation (i.e., a further label is pushed to the MPLS label stack of MPLS data packets).

In most existing IP/MPLS scenarios labels for a forwarding equivalency class (FEC) are allocated per-node, i.e., in each node different label values identify the same FEC, where these labels are distributed by a protocol such as link discovery protocol (LDP). In such scenarios, a node that starts tunneling data packets to a tunnel endpoint must acquire the label valid at the tunnel endpoint for the given FEC. This is the normal procedure also required by plain RLFA. The remote label can be acquired by, for example, by using targeted LDP sessions. In other scenarios, such as in a centrally controlled SDN network, the appropriate labels may be programmed by the central controller.

The extended remote LFA process requires that a PLR node query the RLFA endpoint selected on the unit cost topology about the unit cost topology label assigned to the FEC at this remote endpoint. In such cases, the label stack should be modified as follows:

TABLE VI

| | | | |
|---|---|---|---|
| Originally: | Label d | Payload | |
| | (Label d identifies the LSP leading to destination D) | → to be sent through neighbor A | |
| After losing connectivity to A: | Label r′ | Label d′ | Payload |
| | | → to be sent though neighbor N | |
| | (Label r′ identifies the LSP leading to R on the uc-topo) | (Label d′ identifies the LSP leading to destination D from R on the uc-topo) | |

As set forth previously, if a node needs to reroute a data packet with a label describing an FEC on the unit cost topology, the it needs to be rerouted with the inner label for the same FEC (or node and SRLG failures cannot always be protected):

TABLE VII

| | | | |
|---|---|---|---|
| Originally: | Label d′ | Payload | |
| | (Label d identifies the LSP leading to destination D) | → to be sent through neighbor A | |
| After losing connectivity to A: | Label r′ | Label d′ | Payload |
| | | → to be sent though neighbor N | |
| | (Label r′ identifies the LSP leading to R on the uc-topo) | (Label d′ identifies the LSP leading to destination D from R on the uc-topo) | |

Preparing for Node Failures

Figure 4:
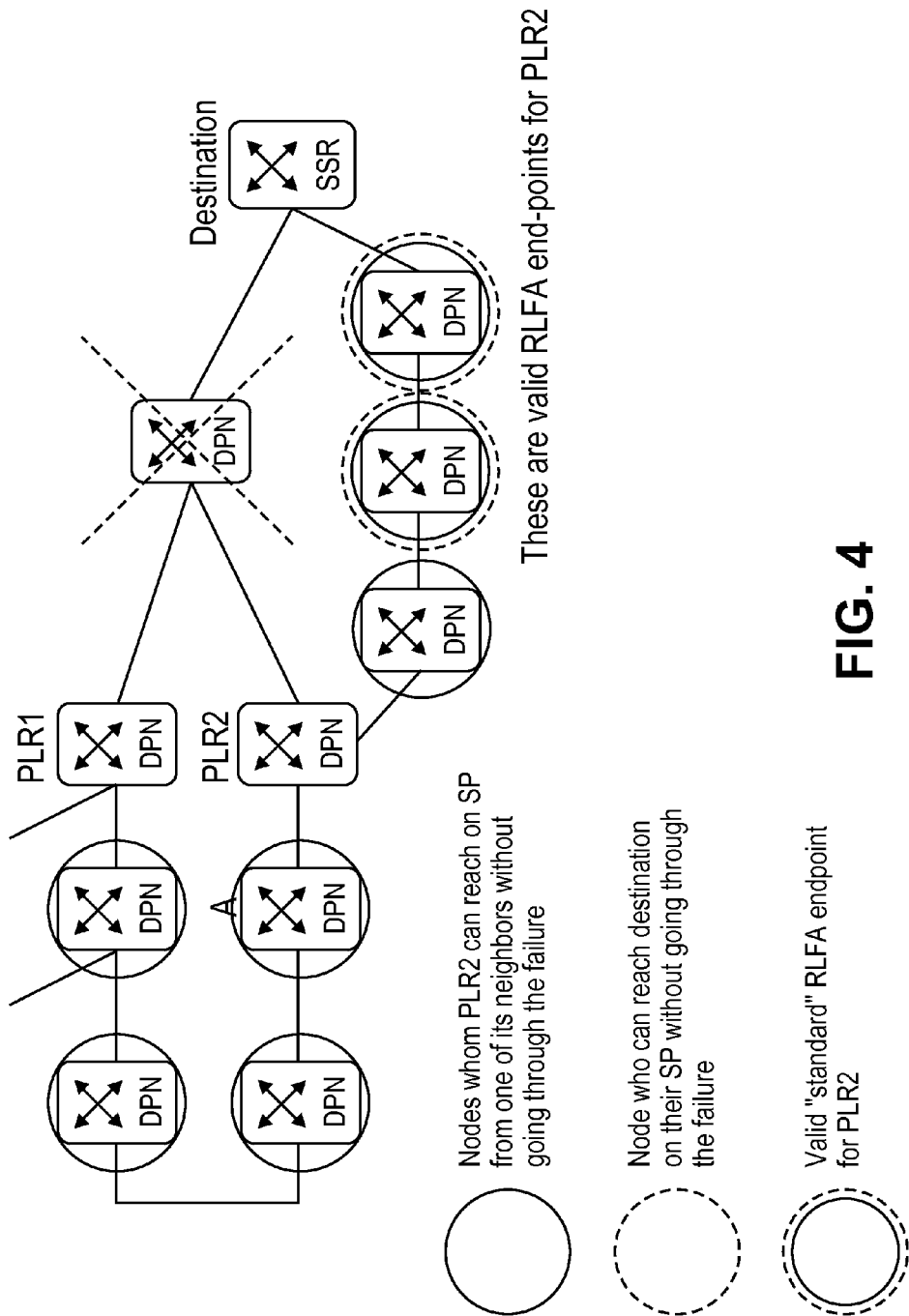
FIG. 4 is a diagram of one embodiment of network topology demonstrating identification of a backup LFA path via identification of an intermediate node.

When preparing for node failures, the extended remote LFA process is similar to link failure preparations. The exception is that in some rare cases it is possible that no endpoint can be found subject to RLFA conditions either on the normal topology (conditions e) and f)), or on the unit-cost topology (conditions g) and h)). Such an example is shown in FIG. 4. That is, PLR1 would not perform fail-over to a tunnel endpoint following standard LFA or RLFA rules, using either the standard topology or on the unit-cost topology. However, in the cases, such as that illustrated in FIG. 4 if the topology is redundant, there exists a path from the PLR1 to the destination node D that does not traverse the failed node F. FIG. 4 shows that PLR2 has a valid RLFA endpoint. PLR2 has a valid standard-compliant RLFA endpoint, at least on the unit-cost topology. PLR2 might not have valid RLF on standard arbitrary-cost topologies. Node A is not a standard-compliant RLFA end-point for PLR1, as the shortest path from A to Destination would run into the LFA condition failure. Still, if PLR1 would select node A as a tunnel end-point, and even if the data packet hits the same failure again on the shortest path on unit cost topology at PLR2, PLR2 would actually be able to make the needed detour. Node A can be seen as an extended RLFA end-point for PLR1.

A sequence of such extended remote LFA tunnels can get around the failure for any single node failure case. The extended remote LFA process provides the following method for providing full node-failure coverage with extended RLFAs for a PLR using Pseudo-code:

```
proc set_normal_RLFA(PLR, F, D) (
    //find local LFA in normal topology or find Remote LFA in normal topology
    //using rules e) and f)
    //variable RLFAType(PLR, F, D) is to be set to "local" or "normal_remote" or
    //"None" otherwise
    //variable RLFA(PLR, F, D) is to be set to LFA next-hop if exists, "None"
    otherwise
}
proc set_uc_RLFA(PLR, F, D) (
    //find Remote LFA in unit-cost topology using rules g) and h)
    //variable RLFAType(PLR, F, D) is to be set to "uc_remote" or "None" if not found
    //variable RLFA(PLR, F, D) is to be set to tunnel endpoint if exists, "None"
    otherwise
}
init:
    for each (PLR, F, D) (
        RLFA(PLR, F, D):="NotCalculated";
        RLFAType(PLR, F, D):="None";
```

```
    }
main:
for each node D in {all nodes} { //D as destination
    for each node F in (next_hops(PLR, D)} { //as failure to prepare for
        if (RLFA(PLR, F, D)! = "NotCalculated") continue with next element in for
        loop;
                                    //it has been calculated before
        set_normal_RLFA(PLR, F, D);
        if (RLFA(PLR, F, D)! = "None") continue with next element in for loop;
            continue;;              //plain (R)LFA was found
        set_uc_RLFA(PLR, F, D);
        if (RLFA(PLR, F, D)! = "None") continue with next element in for loop;
            continue;               //(R)LFA was found on unit-cost
topology
        Path p = "None";
        p = calc_uc_shortest_path(PLR, D, not-via F);
        if (p=="None") continue with next element in for loop;
            continue;       //failure can be protected in no way, topology is not
redundant
        int i = 2;
        //now find the farthest node of the detour path that is
        //reachable on uc-topology on the shortest path
        while (dist'(p[1],p[i])<dist'(p[1],F)+dist'(F,p[i])) ( //condition h)
            i++;
        }
        RLFA(PLR, F, D) = p[i]'; //i.e., secondary address of p[i]
        RLFAType(PLR, F, D) = "uc_remote";
    }
}
```

In the case of a SDN or similar split-architecture network, where the network is controlled by a central controller, the main clause of the above pseudo-code can be encapsulated to iterate through all nodes as potential PLRs, like:

```
for each node PLR in {all nodes} { //iterate through all nodes as
                                   //point of local repairs
    ...
}
```

Depending on the RLFA Type results, if the result type is "uc_remote", then the same encapsulation should be prepared for IP as shown in the IP section above and the same label stacking for MPLS as shown in MPLS section above.

Preparing for SRLG Failures

Multiple links in the network can be marked as part of a common Shared Risk Link Group. The purpose is to handle fate sharing, i.e., when a single lower layer failure causes multiple concurrent failures in upper layer. For instance, cutting an optical link may cause several link failures at the packet layer. Assume that link $l_1$, $l_2$ and $l_3$ are in a common SRLG, $SRLG_1$. When supporting (IP)FRR, a PLR node, when detecting a local link failure that is part of an SRLG, will divert traffic onto a backup path that avoids all resources (links) within the SRLG. For example, if a PLR detects the loss of connectivity to its neighbor through link $l_2$, it will try to divert data packets onto a backup path that avoids not only $l_2$ but also $l_1$ and $l_3$. Of course, the topology needs to be more redundant than what is required for single link failures to make this possible. If there is no alternate path that protects all resources of the SRLG, it may still try handling it as a link or node failure.

The set of valid RLFAs/Extended RLFAs is further restricted compared to the single-link case as now the path to the RLFA/Extended RLFAs endpoint must not pass through either of the links in any SRLGs, and the path from the RLFA/Extended RLFAs endpoint to the destination must also not pass either of the links. If $A_{li}$ and $B_{li}$ denotes the two endpoint of link $l_i$, then for simple LFA:

i) If, $dist(L,D)<dist(L,A_{li})+cost(l_j)+dist(B_{li},D)$, then alternate node L's default shortest path does go through a node that is an element of the SRLG, i.e., L is an SRLG protecting LFA.

For RLFA:

j) $dist(R,D)<dist(R,A_{li})+cost(l_i)+dist(B_{li},D)$, then remote node R's shortest path to destination node D does not lead through link $l_i$ on the original topology; and k) $dist(N,R)<dist(N,A_{li})+cost(l_i)+dist(B_{li},R)$, then there is a neighbour node N from where the shortest path towards remote node R does pass link $l_i$ on the original topology.

While for Extended RLFA:

l) $dist'(R,D)<dist'(R,A_{li})+cost(l_i)+dist'(B_{li},D)$, then remote node R's shortest path to destination node D does not lead through link $l_i$ on the unit cost topology; and m) $dist'(N,R)<dist'(N,A_{li})+cost(l_i)+dist'(B_{li},R)$, then there is a neighbour node N from where the shortest path towards remote node R does pass link $l_i$ on the unit cost topology.

A remote node R is a valid SRLG-protecting end-point if these conditions are true for each of the links in the SRLG.

The node protecting extended RLFA pseudo code given previously can be modified for SRLG handling. The changes required are: node F marks an SRLG; procedure set_uc_RLFA(PLR,F,D) uses SRLG protecting conditions for each link in the SRLG; procedure calc_uc_shortest_path(PLR,D, not-via F) calculates a path that goes not-via any of the links within the SRLG; and in the loop, when looking for the farthest node of the backup path that is reachable on the unit cost topology on the shortest path, use condition j) instead of h). The pseudo-code follows:

```
proc set_normal_RLFA(PLR, F, D) (
    //find local LFA in normal topology or find Remote LFA in normal topology
    //using rules j) and k)
    //variable RLFAType(PLR, F, D) is to be set to "local" or "normal_remote" or
    //"None" otherwise
    //variable RLFA(PLR, F, D) is to be set to LFA next-hop if exists, "None"
otherwise
}
proc set_uc_RLFA(PLR, F, D) (
    //find Remote LFA in unit-cost topology using rules l) and m)
    //variable RLFAType(PLR, F, D) is to be set to "uc_remote" or "None" if not found
    //variable RLFA(PLR, F, D) is to be set to tunnel endpoint if exists, "None"
otherwise
}
init:
    for each (PLR, F, D) {
        RLFA(PLR, F, D):="NotCalculated";
        RLFAType(PLR, F, D):="None";
    }
main:
for each node D in {all nodes} { //D as destination
    for each node F in {next_hops(PLR, D)} ( //as failure to prepare for
        if (RLFA(PLR, F, D)! = "NotCalculated") continue with next element in for
loop;
                    //it has been calculated before
        set_normal_RLFA(PLR, F, D);
        if (RLFA(PLR, F, D)! = "None") continue with next element in for loop;
            continue;              //plain (R)LFA was found
        set_uc_RLFA(PLR, F, D);
        if (RLFA(PLR, F, D)! = "None") continue with next element in for loop;
            continue;              //(R)LFA was found on unit-cost
topology
        Path p = "None";
        p = calc_uc_shortest_path(PLR, D, not-via F);
        if (p=="None") continue with next element in for loop;
            continue;        //failure can be protected in no way, topology is not
redundant
        int i = 2;
        //now find the farthest node of the detour path that is
        //reachable on uc-topology on the shortest path
        for (i = 1; i<=max_hop_num; i++) {
            for (j = 1; j<=num_of_srlg; j++) {
                if (dist'(p[1],p[i])=dist'(p[1],A_{Ij})+1+dist'(B_{Ij},p[i])) //1 ==
cost(I_j)
                    goto Finish;
            }
        }
    Finish:
        RLFA(PLR, F, D) = p[i]'; //i.e., secondary address of p[i]
        RLFAType(PLR, F, D) = "uc_remote";
    }
}
```

The Fail-Over Process

The data plane for extended remote LFA needs no further capabilities compared to standard RLFA. The data plane has to be capable to switch next-hops and put packets into tunnels just as with RLFA. In this case, the differences take place in control plane: alternate next-hops and corresponding alternate routes are calculated in a special way as described herein above.

Figure 5A:
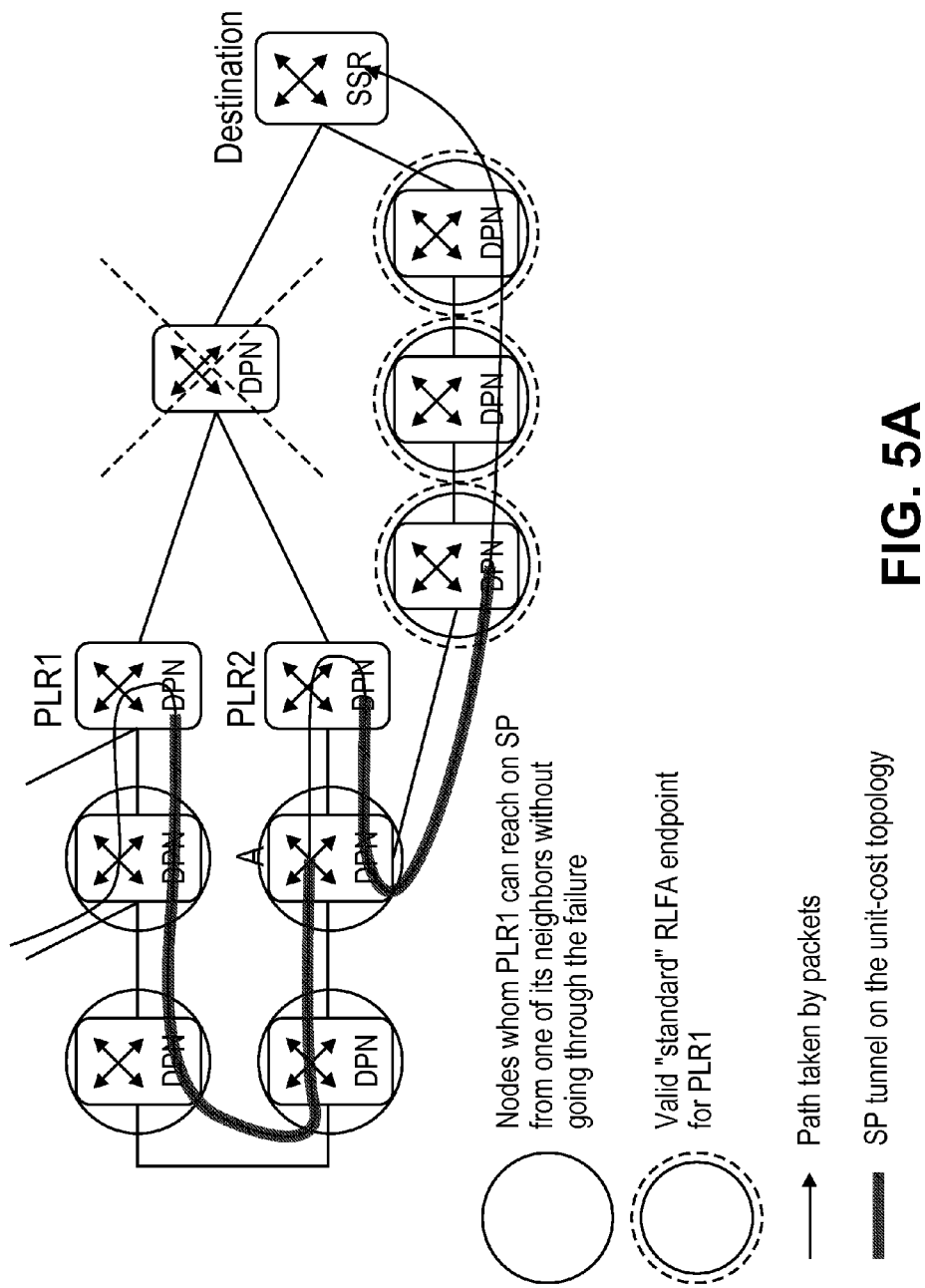
FIGS. 5A and 5B are diagrams of one embodiment of a network topology where multiple intermediated nodes are identified in a backup LFA path calculation.
Figure 5B:
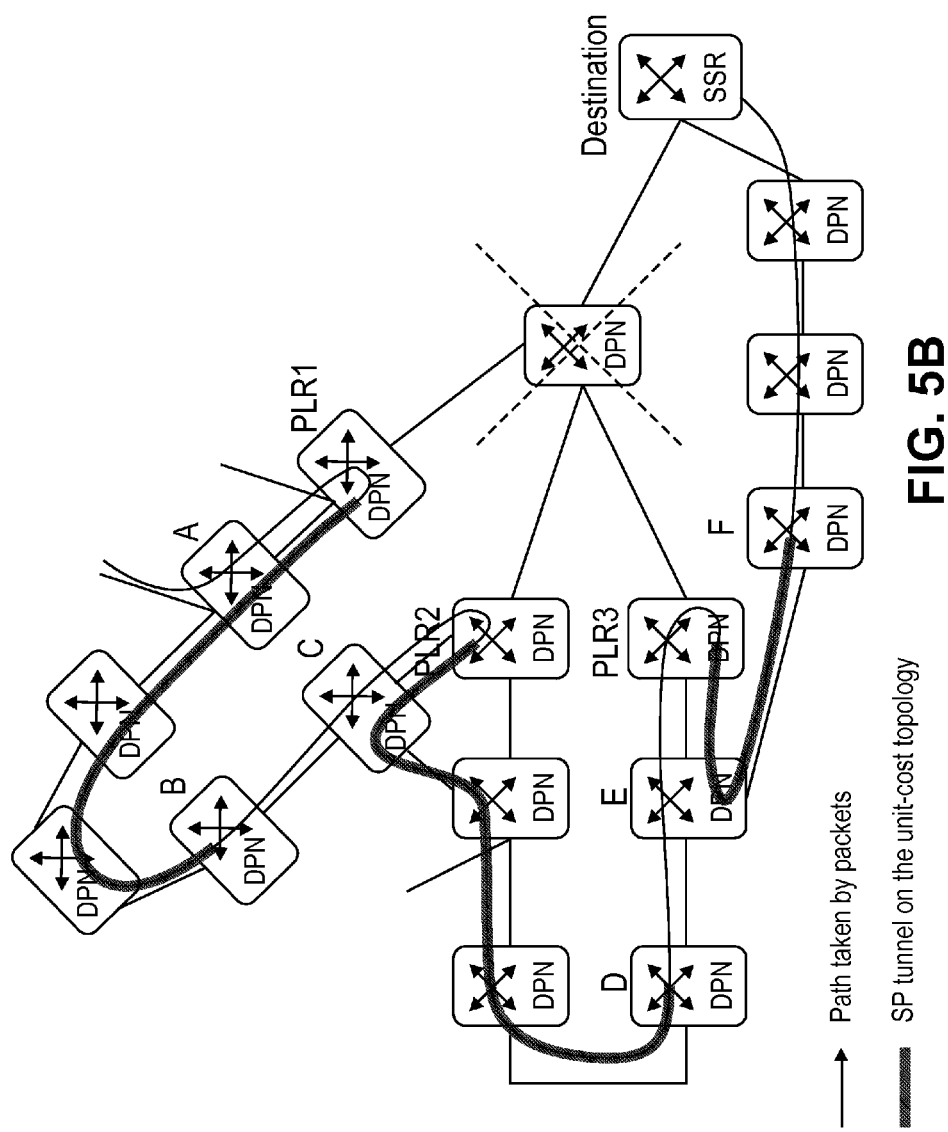

In case of node failures, it may be possible that packets get around the failure through several detour tunnels to intermediate nodes. For instance, in the previous example, PLR1 would tunnel packet to intermediate node A, the packets would hit PLR2, which then would tunnel packets to one of its valid RLFA endpoints. FIGS. 5A and 5B illustrate more complicated topology scenarios where multiple intermediate nodes are identified to chain together the backup path to the destination node D. FIG. 5A illustrates a two tunnel scenario before an LFA path completes the path to the destination node. FIG. 5B illustrates a three tunnel scenario before an LFA path to the destination node D completes the path to the destination node.

Figure 6:
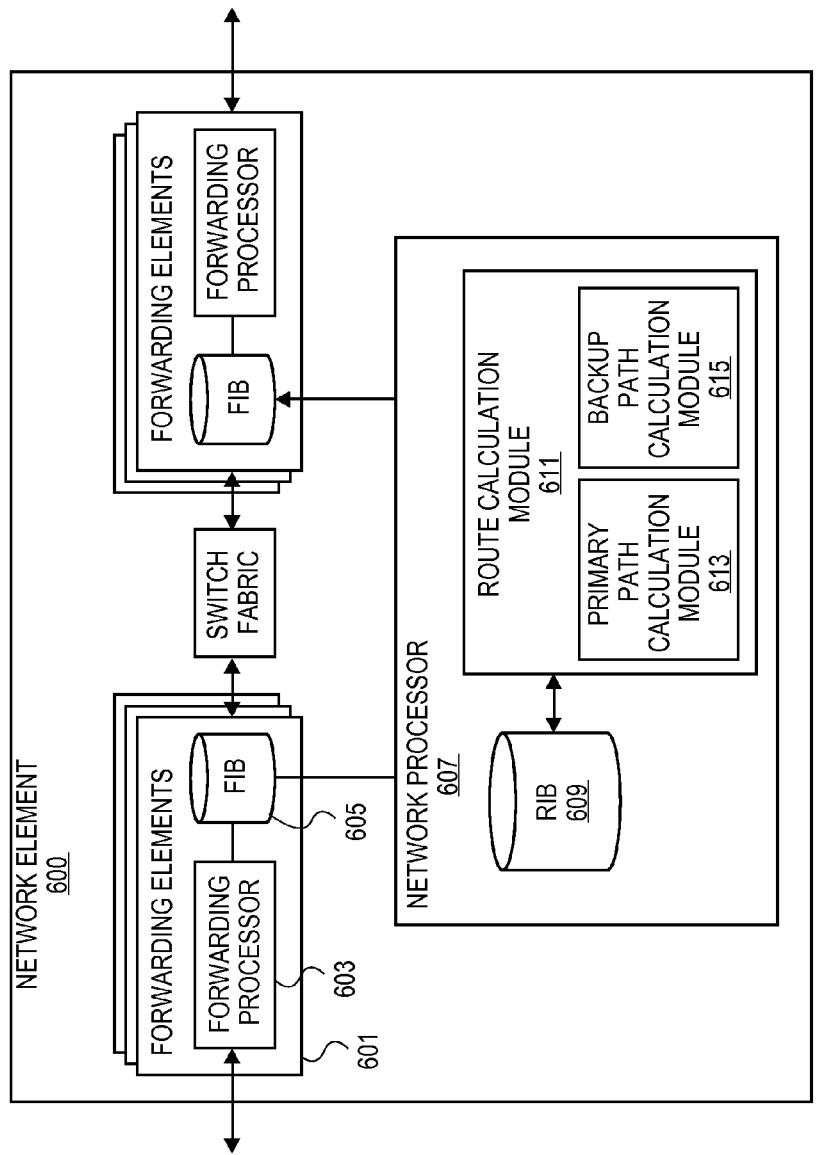
FIG. 6 is a diagram of one embodiment of a network element implementing the backup LFA path calculation process.

FIG. 6 is a diagram of one embodiment of a network element implementing the extended remote LFA process. The network element 600 is provided by way of example, rather than limitation. One skilled in the art would understand that other network elements with differing configuration can implement the process described herein. In the example embodiment, the network element 600 includes a network processor 607 and a set of forwarding elements 601. The forwarding elements can be connected by an interconnect such as a switch fabric or similar interconnect allowing transfer of the data packets from one forwarding element to another. Similarly, the network processor 607 can be connected to each of the forwarding elements 601 through the same or a different set of interconnects such that the network processor can exchange data and configure the forwarding elements 601.

In one embodiment, the forwarding elements 601 can be line cards or similar components of a network element. The network element 600 can include any number of forwarding elements 601. The forwarding elements 601 can receive and forward data traffic over any number of communication links or ports. The forwarding element 601 can include a forwarding processor that processes each inbound and outbound data packet to identify how to forward the data packet toward its destination by identifying a next hop for the data packet using information stored in the forwarding information base 605. The forwarding element 601 matches the destination address and other meta data of the data packets with the information in the forwarding information base 605 to identify the next hop for the data packet. The forwarding processor 601 then forwards the data packet over the corresponding port or communication link or sends the data packet to another forwarding element 601 over the switch fabric that is attached to the next hop port or communication link.

In one embodiment, the network processor 607 can manage the programming and of the forwarding information base 605 using the route information base 609. The network processor 607 can manage other control plane functions of the network element 600 as well. The route information base 609 contains information regarding the topology of the network in which the network element 600 resides. The route information base 609 can be updated and maintained using any type of discovery protocol or similar control plane protocol.

In one embodiment, the network processor 607 also implements a primary path calculation module 613 that processes the information of the route information base 609 to identify the primary and back paths in support of FRR or similar protection schemes. The primary path calculation module 613 can execute a shortest path tree calculation algorithm or similar algorithm to determine a path to each of the nodes in the network. This SPT is utilized to program the next hops for each destination node in the forwarding information base 605 of the forwarding elements 601. Similarly, the backup path calculation module 615 implements the extended remote LFA process described herein above such that next hops for the backup LFA paths for all nodes in the network can be programmed into the forwarding information base 605 of the forwarding elements 601.

Figure 7:
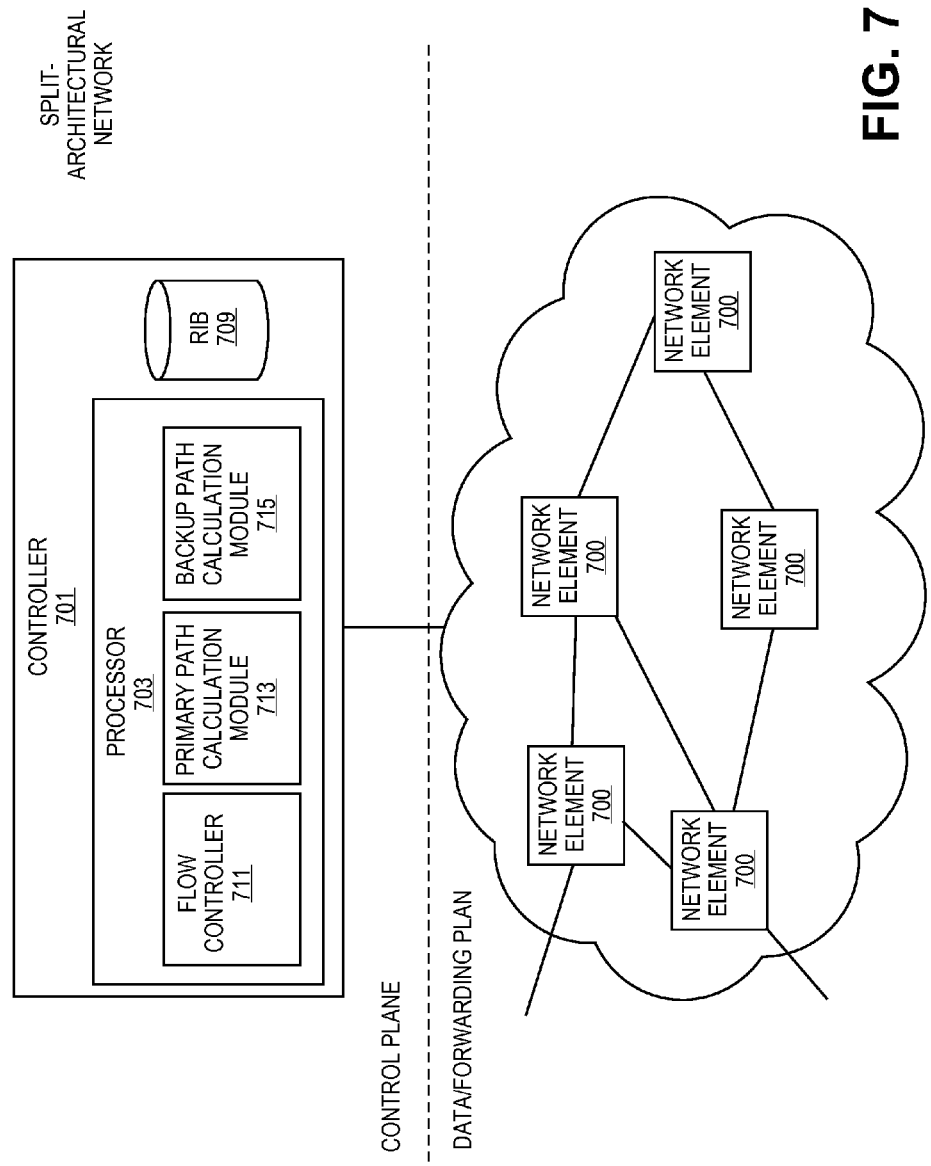
FIG. 7 is a diagram of one embodiment of a split-architecture implementation of the process.

FIG. 7 is a diagram of one embodiment of a split-architecture implementation of the process. In one embodiment, the process is implemented by a controller 701 in a split-architecture, rather than at the network element 700. The controller 701 manages the control plane functionality of the network, while the network elements 700 implement the data/forwarding plane aspects of the network. Thus, the network elements 600 include the forwarding elements and forwarding information base as described above. However, the control plane functions have been removed to a remote controller 701 that can be at any location relative to the network in which the network elements 700 are situated such that the controller is in communication with each of the network elements 700.

The controller 701 can include a processor to execute the primary path calculation module 713 and the backup path calculation module 715. These functions can be implemented by a single processor 703 or a set of processors distributed over any number of devices implementing the controller 701. For sake of clarity an example with a single device and processor is described. The path calculation modules can utilize the route information base 709 that is also maintained locally or at a location in communication with the processor 703.

A flow controller 711 can implement any flow control protocol to enable the controller to communicate and configure the network elements 700 in the network. In one example embodiment, the flow controller 711 can communicate and configured the flow control elements of the network elements 700 using the OpenFlow protocol. One skilled in the art would understand that any similar flow control protocol can be utilized that enables the controller to configure the network elements and control the data plane of the network.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method implemented by a network element functioning as a point of local repair (PLR), the method for determining a backup path for a fast reroute (FRR) process to be utilized in response to a network event invalidating a primary path to a destination node, where the method identifies at least one intermediate node as an extended remote loop free alternative that has a backup loop free alternative (LFA) path to a destination node in a network where no path meeting LFA conditions can be found for the PLR, the method comprising the steps of:

calculating shortest paths from the PLR to each destination node in the network using a normal topology;
    calculating shortest paths from the PLR to each destination node in the network using a unit cost topology;
    selecting a next destination node D in the network without a calculated backup path from the PLR;
    determining a primary path next hop node F for the destination node D;
    determining whether an LFA path or remote LFA (RLFA) path exists from the PLR to the destination node D where the backup LFA path or RLFA path does not traverse the primary path next hop node F in the calculated shortest paths using the normal topology;
    determining whether a remote RLFA path exists from the PLR to the destination node D where the backup LFA path or RLFA path does not traverse the primary path next hop node F in the calculated shortest paths using the unit cost topology;
    determining an intermediate node on a shortest path from the PLR to the destination node D using topology that excludes the primary next hop node F and that meets LFA conditions, in response to determining that no LFA path or RLFA path exists from the PLR to the destination node D that does not traverse the primary next hop node F in the calculated shortest paths using the normal topology and the unit cost topology; and
    selecting the intermediate node on the shortest path as an intermediate destination for data traffic for destination node D to be utilized as the backup path to the destination node D during the FRR process.

2. The method of claim 1, further comprising the step of:
checking whether a backup LFA path has been calculated for each destination node; and
progressing to a next destination node where the backup LFA path has been calculated.

3. The method of claim 1, further comprising the step of:
selecting a next hop node of the LFA path from the PLR to the destination node D from the normal topology as the backup LFA path for the destination node D where the LFA path exists from the PLR node to the destination node D that does not traverse the next hop node F in the calculated shortest paths using the normal topology.

4. The method of claim 1, further comprising the step of:
selecting a tunnel to the RLFA path from the PLR to the destination node D from the normal topology as the backup LFA path for the destination node D where the RLFA path exists from the PLR node to the destination node D that does not traverse the next hop node F in the calculated shortest paths using the normal topology.

5. The method of claim 1, further comprising the step of: selecting a next hop node of the LFA path from the PLR to the destination node D from the normal topology as backup LFA path for the destination node D where the LFA path exists from the PLR node to the destination node D that does not traverse the next hop node F in the calculated shortest paths using the unit cost topology.

6. The method of claim 1, wherein each node in the unit cost topology uses a separate address than used in the normal topology.

7. A network element functioning as a point of local repair (PLR), the network element configured to implement a method for determining a backup path for a fast reroute (FRR) process to be utilized in response to a network event invalidating a primary path to a destination node, where the method identifies at least one intermediate node as an extended remote loop free alternative that has a backup loop free alternative (LFA) path to a destination node in a network where no path meeting LFA conditions can be found for the PLR, the network element comprising:
at least one forwarding element to forward data traffic along a primary path until the network event and to forward the data traffic along the backup LFA path after the network event;
a network processor coupled to the at least one forwarding element, the network processor configured to execute a primary path calculation module and a backup path calculation module, the primary path calculation module configured to calculate shortest paths from the PLR to each destination node in the network using a normal topology, and the backup path calculation module configured to calculate shortest paths from the PLR to each destination node in the network using a unit cost topology, to select a next destination node D in the network without a calculated backup path from the PLR, to determine a primary path next hop node F for the destination node D, to determine whether an LFA path or remote LFA (RLFA) path exists from the PLR to the destination node D where the backup LFA path or RLFA path does not traverse the primary path next hop node F in the calculated shortest paths using the normal topology, to determine whether a remote RLFA path exists from the PLR to the destination node D where the backup LFA path or RLFA path does not traverse the primary path next hop node F in the calculated shortest paths using the unit cost topology, to determine an intermediate node on a shortest path from the PLR to the destination node D using a topology that excludes the primary next hop node F and that meets LFA conditions, in response to determining that no LFA path or RLFA path exists from the PLR to the destination node D that does not traverse the primary next hop node F in the calculated shortest paths using the normal topology and the unit cost topology, and to select the intermediate node on the shortest path as an intermediate destination for data traffic for destination node D to be utilized as the backup path to the destination node D during the FRR process.

8. The network element of claim 7, wherein the backup path calculation module is further configured to check whether a backup LFA path has been calculated for each destination node, and to progress to a next destination node where the backup LFA path has been calculated.

9. The network element of claim 7, wherein the backup path calculation module is further configured to select a next hop node of the LFA path from the PLR to the destination node D from the normal topology as the backup LFA path for the destination node D where the LFA path exists from the PLR node to the destination node D that does not traverse the next hop node F in the calculated shortest paths using normal topology.

10. The network element of claim 7, wherein the backup path calculation module is further configured to select a tunnel to the RLFA path from the PLR to the destination node D from the normal topology as the backup LFA path for the destination node D where the RLFA path exists from the PLR node to the destination node D that does not traverse the next hop node F in the calculated shortest paths using the normal topology.

11. The network element of claim 7, wherein the backup path calculation module is further configured to select a next hop node of the LFA path from the PLR to the destination node D from the normal topology as the backup LFA path for the destination node D where the LFA path exists from the PLR node to destination node D that does not traverse the next hop node F in the calculated shortest paths using unit cost topology.

12. The network element of claim 7, wherein each node in the unit cost topology uses a separate address than used in the normal topology.

13. A controller for a split-architecture network configured to implement a method for determining a backup path for a fast reroute (FRR) process to be utilized in response to a network event invalidating a primary path to a destination node, where the method identifies at least one intermediate node as an extended remote loop free alternative that has a backup loop free alternative (LFA) path to a destination node in a network where no path meeting LFA conditions can be found for a point of local repair (PLR), the controller comprising:
a flow controller to configure the PLR to forward data traffic along a primary path before the network event and along the backup LFA path after the network event;
a processor coupled to the flow controller, the processor configured to execute a primary path calculation module and a backup path calculation module, the primary path calculation module configured to calculate shortest paths from the PLR to each destination node in the network using a normal topology, and the backup path calculation module configured to calculate shortest paths from the PLR to each destination node in the network using a unit cost topology, to select a next destination node D in the network without a calculated backup path from the PLR, to determine a primary path next hop node F for the destination node D, to determine whether an LFA path or remote LFA (RLFA) path exists from the PLR to the destination node D where the backup LFA path or RLFA path does not traverse the primary path next hop node F in the calculated shortest paths using the normal topology, to determine whether a remote RLFA path exists from the PLR to the destination node D where the backup LFA path or RLFA path does not traverse the primary path next hop node F in the calculated shortest paths using the unit cost topology, to determine an intermediate node on a shortest path from the PLR to the destination node D using a topology that excludes the primary next hop node F and that meets LFA conditions, in response to determining that no LFA path or RLFA path exists from the PLR to the destination node D that does not traverse the primary next hop node F in the calculated shortest paths using the normal topology and the unit cost topology, and to select the intermediate node on the shortest path as an intermediate destination for data traffic for destination node D to be utilized as the backup path to the destination node D during the FRR process.

14. The controller of claim 13, wherein the backup path calculation module is further configured to check whether a backup LFA path has been calculated for each destination node, and to progress to a next destination node where the backup LFA path has been calculated.

15. The controller of claim 13, wherein the backup path calculation module is further configured to select a next hop node of the LFA path from the PLR to the destination node D from the normal topology as the backup LFA path for the destination node D where the LFA path exists from the PLR node to the destination node D that does not traverse the next hop node F in the calculated shortest paths using the normal topology.

16. The controller of claim 13, wherein the backup path calculation module is further configured to select a tunnel to the RLFA path from the PLR to the destination node D from the normal topology as the backup LFA path for the destination node D where the RLFA path exists from the PLR node to the destination node D that does not traverse the next hop node F in the calculated shortest paths using the normal topology.

17. The controller of claim 13, wherein the backup path calculation module is further configured to select a next hop node of the LFA path from the PLR to the destination node D from the normal topology as the backup LFA path for the destination node D where the LFA path exists from the PLR node to the destination node D that does not traverse the next hop node F in the calculated shortest paths using the unit cost topology.

18. The controller of claim 13, wherein each node in the unit cost topology uses a separate address than used in the normal topology.

* * * * *

UNITED STATES PATENT AND TRADEMARK OFFICE
CERTIFICATE OF CORRECTION

PATENT NO. : 9,438,472 B2
APPLICATION NO. : 13/946827
DATED : September 6, 2016
INVENTOR(S) : Császár et al.

It is certified that error appears in the above-identified patent and that said Letters Patent is hereby corrected as shown below:

On the Title Page

In Item (74), under "Attorney, Agent, or Firm", in Column 2, Line 2, delete "Webster & Elliot, LLP" and insert -- Webster & Elliott, LLP --, therefor.

In the Drawings

In Fig. 3B, Sheet 4 of 12, in Step "343", in Line 4, delete "SHORTED" and insert -- SHORTEST --, therefor.

In the Specification

In Column 4, Line 9, delete "other," and insert -- other. --, therefor.

In Column 4, Line 47, delete "apiece" and insert -- a piece --, therefor.

In Column 14, Line 62, delete "though neighbor" and insert -- through neighbor --, therefor.

In Column 15, Line 20, delete "though neighbor" and insert -- through neighbor --, therefor.

In Columns 15-16, Line 36, delete "though neighbor" and insert -- through neighbor --, therefor.

In Column 15, Line 56, delete "though neighbor" and insert -- through neighbor --, therefor.

In Columns 17-18, in Table VI, delete "though neighbor" and insert -- through neighbor --, therefor.

In Columns 17-18, in Table VII, delete "though neighbor" and insert -- through neighbor --, therefor.

Signed and Sealed this
Twenty-third Day of May, 2017

Michelle K. Lee
*Director of the United States Patent and Trademark Office*

CERTIFICATE OF CORRECTION (continued)
U.S. Pat. No. 9,438,472 B2

In Columns 19-20, in Table, Line 10, delete "continue;; //plain (R)LFA" and insert -- continue; //plain RLFA --, therefor.

In Column 23, Line 7, delete "processor 601" and insert -- processor 607 --, therefor.